Inventors
William F. Eagan
Roger L. Robertson
by Howard M. Herriot
Attorney

United States Patent Office 2,723,372
Patented Nov. 8, 1955

2,723,372

SYSTEM UTILIZING CURRENT LIMIT DEVICE PROVIDING LINE DROP COMPENSATION

William F. Eagan, West Allis, and Roger L. Robertson, Milwaukee, Wis., assignors to Allis-Chalmers Manufacturing Company, Milwaukee, Wis.

Application July 29, 1954, Serial No. 446,593

5 Claims. (Cl. 321—19)

This invention relates in general to voltage regulating systems having current limit devices and in particular to such systems wherein the current limit device provides line drop compensation in the range of current values below the limit value.

Voltage regulating systems are known in which a saturable reactor responds to a voltage control signal to control the voltage of a load and responds to the output of a linear-nonlinear resistor current limit bridge circuit when the load current exceeds a predetermined limit value to thus limit the load current to said limit value.

A disadvantage of such systems is that the current limit bridge circuit has no effect at values of current less than the limit value and therefore cannot accomplish any line drop compensation to aid the voltage regulating portion of the system in maintaining the load voltage constant in the face of changing load current in the range of current values below the limit value.

The invention overcomes this disadvantage by providing a current limit device comprising a saturable reactor in combination with a biased linear-nonlinear resistor bridge circuit for limiting the current to a limit value and for providing line drop compensation while the load current varies in a range below the limit value to enable the voltage regulator to maintain the load voltage constant.

It is therefore an object of this invention to provide a current limit device which both limits the current to a limit value and provides line drop compensation for voltage regulation when the current is less than the limit value.

Other objects and advantages will appear from the following detailed description when read in connection with the accompanying drawings, in which:

Fig. 1 diagrammatically illustrates one embodiment of the invention as applied to a rectifying system;

Figure 1:
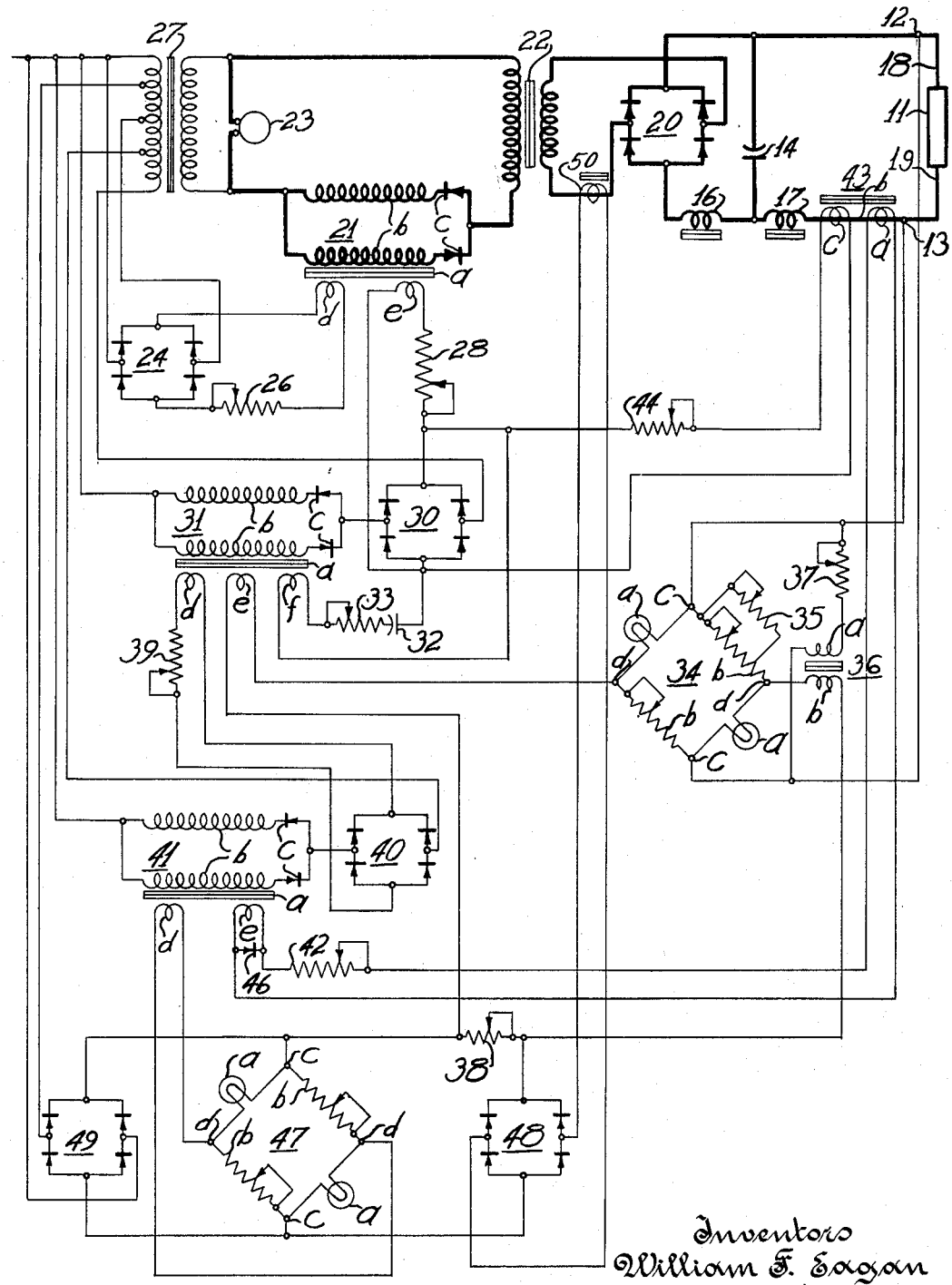

In the drawing, where an underlined reference numeral appears in proximity with a plurality of lower case reference letters, the numeral indicates a means comprising a plurality of elements and the elements are indicated by the lower case reference letters. In the specification, these elements are identified by the reference numeral accompanied by the reference letter.

Referring to Fig. 1, the invention is shown embodied in a rectifying system wherein a main rectifier 20 supplies direct current to a load device 11. The direct current terminals of the rectifier 20 are connected to output terminals 12, 13 through a well known filtering arrangement comprising capacitor 14 and choke coils 16, 17 to impress a direct current voltage across output terminals 12, 13 for providing a direct current voltage source for load device 11 which is connected across terminals 12, 13 by means of cables or conductors 18, 19. The alternating current terminals of the rectifier 20 are connected through a transformer 22 and the reactance windings of a saturable reactor 21 to an alternating current source of substantially constant voltage such as an alternating current generator 23.

Saturable reactor 21 has a core 21a, a pair of reactance windings 21b, a pair of rectifiers 21c, a bias winding 21d and a signal winding 21e. Rectifiers 21c provide self-saturation or self-excitation for the reactor 21. The bias winding 21d and signal winding 21e act in opposition to each other to determine the reactance of reactance windings 21b to control the voltage applied to transformer 22 and rectifier 20 and thus to control the direct current voltage of rectifier 20 impressed across output terminals 12, 13. Bias winding 21d of reactor 21 is connected to the direct current terminals of rectifying device 24 through an adjustable resistor 26. The alternating current terminals of rectifying device 24 are connected to a transformer 27 which is energized by alternating current generator 23. The bias winding 21d thus has impressed thereon a substantially constant unidirectional bias voltage, the value of which is determined by the setting of resistor 26. Signal winding 21e is connected through an adjustable resistor 28 to the direct current terminals of a second rectifier 30. The direct current voltage output of rectifier 30 is controlled by a saturable reactor 31.

Reactor 31 has a core 31a, a pair of reactance windings 31b, a pair of rectifiers 31c, a current limit control winding 31d, a voltage control winding 31e and a feedback winding 31f. Reactance windings 31b and rectifiers 31c are serially connected with the alternating current terminals of rectifier 30 to transformer 27. Signal winding 21e of reactor 21 thus has impressed thereon a unidirectional signal voltage, the magnitude of which depends upon the net effect of windings 31d, 31e of reactor 31. Reactors 21 and 31 are included in the voltage regulator portion of the system. Winding 31e is the voltage responsive element and winding 31d is the current limit responsive element of the voltage regulator.

The direct current output voltage of rectifier 30 is fed back into feedback winding 31f through a capacitor 32 and an adjustable resistor 33 to prevent the system from overshooting and oscillating during the voltage recovery. The setting of resistor 33 determines the speed and manner of recovery.

Voltage control winding 31e is connected to respond to the output of a voltage error detector comprising a bridge circuit 34 and a transformer 36. The bridge circuit 34 comprises four resistors, at least one of which is a nonlinear voltage dependent resistor. As shown, the bridge circuit 34 has a pair of nonlinear voltage dependent resistors such as tungsten filament light bulbs 34a connected in series with a pair of linear or constant adjustable resistors 34b to form a bridge circuit 34. A first pair of opposite junctions 34c of the bridge circuit are connected across output terminals 12, 13 of the rectifying system to have the direct current voltage of rectifier 20 impressed on junctions 34c. The constant resistors 34b may be adjusted to cause the voltage across the other pair of opposite junctions 34d to be approximately zero for the desired value of the controlled voltage across terminals 12, 13 and to vary in magnitude and direction with variations in the controlled voltage from the desired value.

A rheostat 35 may be used to cause the bridge circuit 34 to balance at any desired value of the controlled voltage which is impressed across junctions 34c. A reduction of the resistance of rheostat 35 causes the bridge circuit to balance at a lower value of the controlled voltage.

Transformer 36 has a first winding 36a connected in series with an adjustable resistor 37 across input junctions 34c, and a second winding 36b connected in series with output junctions 34d, an adjustable resistor 38 and voltage control winding 31e of saturable reactor 31. Voltage control winding 31e thus has impressed thereon a unidirectional reversible control voltage which varies in direction and magnitude with variations in the controlled direct current voltage of rectifier 20 appearing across output terminals 12, 13.

The time delay inherent in the nonlinear voltage dependent resistors 34a is compensated for by transformer 36. Any change in the input to the bridge circuit at junctions 34c is sensed by transformer winding 36a and is immediately reflected into transformer winding 36b which is in series with junctions 34d and voltage control winding 31e. Voltage control winding 31e thus senses the change without time delay. Resistor 37 is adjusted to obtain the desired speed of response. The disadvantage of the inherent time delay in the nonlinear resistor is thus overcome.

The voltage impressed on current limit control winding 31d of reactor 31 is controlled by a current limit device comprising a saturable reactor 41 and a bridge circuit 47. Winding 31d is connected through an adjustable resistor 39 to the direct current terminals of a rectifier 40. The direct current output voltage of rectifier 40 is controlled by saturable reactor 41.

Reactor 41 has a core 41a, a pair of reactance windings 41b, a pair of rectifiers 41c, a saturating winding 41d and a damping winding 41e. Reactance windings 41b and rectifiers 41c are serially connected with the alternating current terminals of rectifier 40 to transformer 27. There is thus impressed on current limit control winding 31d of reactor 31 a unidirectional current limit control voltage, the magnitude of which depends upon the net effect of saturating winding 41d and damping winding 41e.

Damping winding 41e is connected through an adjustable resistor 42 to the output winding 43a of a damping transformer 43. An input winding 43c of this damping transformer is connected through an adjustable resistor 44 to the direct current output terminals of rectifier 30. The conductor carrying the direct current output of main rectifier 20 acts as another input winding 43b for damping transformer 43. Transformer 43 thus senses changes in the direct current in the load device 11 and changes in the output of rectifier 30 to impress a damping signal across damping winding 41e. A rectifier 46 is connected across winding 41e to cause it to receive damping signals of one direction only.

Saturating winding 41d is connected to respond to the output of a bridge circuit 47. The bridge circuit 47 comprises four resistors, at least one of which is a nonlinear resistor. As shown, the bridge circuit 47 has a pair of nonlinear resistors such as tungsten filament light bulbs 47a and a pair of linear or constant adjustable resistors 47b connected therewith in series to form a bridge circuit having a pair of opposite input junctions 47c and a pair of opposite output junctions 47d.

Rectifier 48 has its direct current terminals connected through resistor 38 to input junctions 47c. The alternating circuit terminals of rectifier 48 are fed from a current transformer 50 in the alternating current line that feeds main rectifier 20. Input junctions 47c thus have impressed thereacross from rectifier 48, a unidirectional voltage dependent upon the direct current in load device 11.

Input junctions 47c also are connected to the direct current terminals of rectifier 49. The alternating current terminals of rectifier 49 are connected to transformer 27. Input junctions 47c therefore also have impressed thereacross, from rectifier 49, a substantially constant unidirectional reference voltage.

The output junctions 47d of the bridge circuit are connected to saturating winding 41d of reactor 41 to impress thereon a reversible unidirectional voltage dependent upon the value of the direct current in load device 11.

Figure 2:
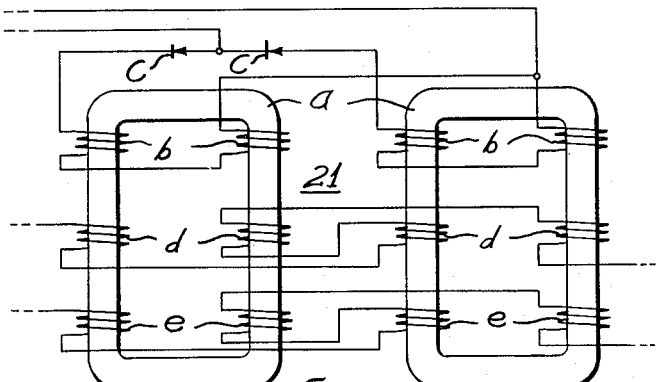
Fig. 2 shows in more detail, a saturable reactor shown in Fig. 1.

Fig. 2 shows in detail the connection for the main saturable reactor 21. Bias winding 21d is wound and energized so that its ampere turns oppose the ampere turns due to the direct current component in reactance windings 21b and rectifiers 21c. Signal winding 21e is wound and energized so that its ampere turns aid the ampere turns due to the direct current component of the current in reactance windings 21b and rectifiers 21c. Increases in current through signal windings 21e cause increases in the direct current voltage of the main rectifier 20 and decreases of said current cause decreases of said voltage.

Figure 3:
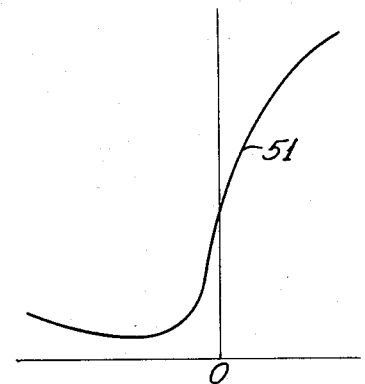
Fig. 3 is a graph illustrating the transfer characteristic of the reactor shown in Fig. 2.

Fig. 3 is a graph showing the transfer characteristic 51 of saturable reactor 21. The abscissa represents the net ampere turns of windings 21d, 21e and the ordinate represents the direct current voltage of main rectifier 20.

Figure 4:
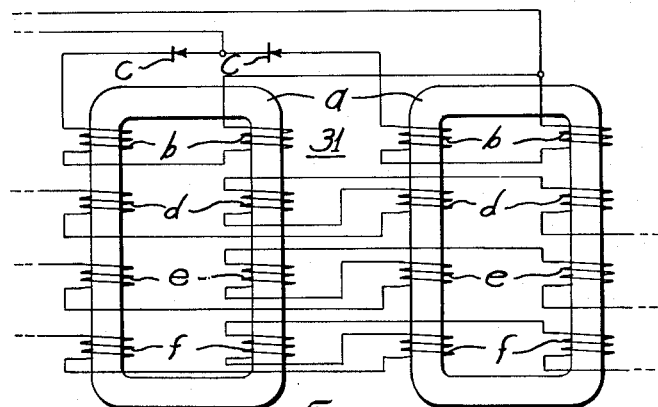
Fig. 4 shows, in more detail, a saturable reactor shown in Fig. 1.

Fig. 4 shows in detail the connection for saturable reactor 31. Current limit control winding 31d is wound and energized so that its ampere turns oppose the ampere turns due to the direct current component of the current in reactance windings 31b due to rectifiers 31c. Voltage control winding 31e may either aid or oppose the saturation of the reactor in response to the reversible unidirectional output voltage of bridge circuit 34 which is impressed on winding 31e. When the direct current voltage of main rectifier 20 is below the desired value, the ampere turns of winding 31e act to increase the voltage impressed on signal winding 21e of reactor 21. When the direct current voltage of main rectifier 20 is above the desired value, the ampere turns of winding 31e act to decrease the voltage impressed on signal winding 21e of reactor 21.

Figure 5:
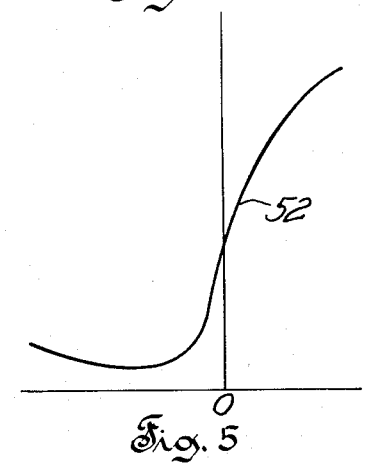
Fig. 5 is a graph illustrating the transfer characteristic of the reactor shown in Fig. 4.

Fig. 5 is a graph showing the transfer characteristic curve 52 of saturable reactor 31. The abscissa represents the net ampere turns of windings 31d, 31e and the ordinate represents the signal voltage impressed on winding 21e of reactor 21.

Figure 6:
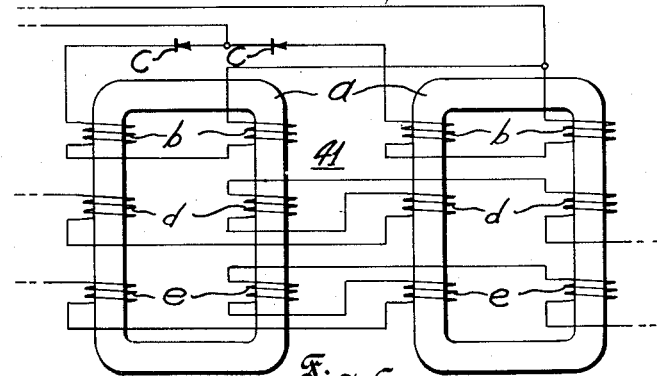
Fig. 6 shows, in more detail, a saturable reactor shown in Fig. 1.

Fig. 6 shows the details of the connections for saturable reactor 41. Saturating winding 41d has impressed thereon a reversible unidirectional voltage and therefore its ampere turns may either aid or oppose the ampere turns due to the direct current component in reactance windings 41b due to rectifiers 41c and therefore may either increase or decrease the unidirectional voltage impressed on current limit control winding 31d of reactor 31. Damping winding 41e, because of rectifier 46 connected thereacross has an appreciable effect only upon a decrease in the current in load device 11, whereupon its ampere turns act to decrease the voltage of current limit control winding 31d of reactor 31.

Figure 7:
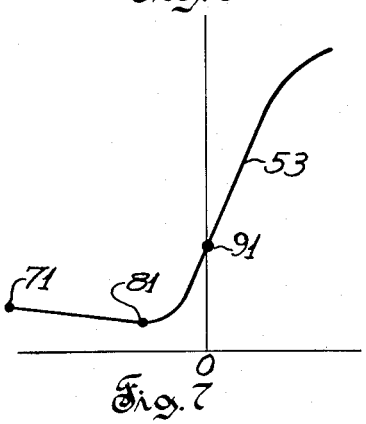
Fig. 7 is a graph illustrating the transfer characteristic of the reactor shown in Fig. 6.

Fig. 7 is a graph showing the transfer characteristic curve 53 of saturable reactor 41. The abscissa represents the ampere turns of saturating winding 41d and the ordinate represents the voltage impressed on current limit control winding 31d of reactor 31.

Figure 8:
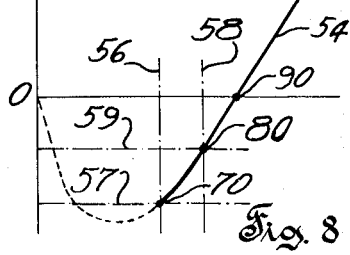
Fig. 8 is a graph illustrating the transfer characteristic of a bridge circuit shown in Fig. 1.

Fig. 8 is a graph showing the transfer characteristic curve 54 of the current limit bridge circuit 47. The abscissa represents the voltage across input junctions 47c which is dependent upon the load current and the ordinate represents the voltage across output junctions 47d which is impressed on saturating winding 41d of reactor 41. The reference voltage impressed on input junctions 47c by rectifier 49 is represented by 56. This reference voltage causes a voltage output represented by 57 and prevents operation on the dash line portion of the curve. As long as the voltage of rectifier 48 is equal to or less than that of rectifier 49, the bridge circuit operates at a point 70 on the curve. When the voltage of rectifier 48 exceeds the reference voltage of rectifier 49, the bridge circuit may operate at any point on the curve to the right of point 70 and the bridge output at output junctions 47d varies in dependence upon the voltage of rectifier 48. For a voltage of rectifier 48 represented by 58, which is the voltage corresponding to the limit value of the load current, the bridge operates at point 80 to have an output voltage represented by 59. For voltages of rectifier 48 higher than voltage 58, the bridge output decreases to become zero at point 90, reverses in direction and increases in magnitude for still further increases in the voltage of rectifier 48. Points 71, 81 and 91 on the curve 53 in Fig. 7 corresponds to points 70, 80 and 90 on curve 54 in Fig. 8.

In the operation of the system, the direct current voltage of main rectifier 20 impressed across terminals 12, 13, is controlled according to so-called knee curve regulation to maintain the voltage across load device 11 substantially constant as load current therethrough varies from zero up to a predetermined limit value.

The load device could be, for example, an airplane starting motor having a low thermal capacity. The load current must therefore be carefully controlled so as not to overheat the motor during the starting period. When such a motor is thrown on the system, its current would be limited only by the total resistance of its armature circuit unless its terminal voltage is reduced. As the motor accelerates and develops a counterelectromotive force, the voltage can be increased and the current still held under the predetermined limit value. The voltage will keep increasing until the knee of the voltage current curve is reached, at which point the load current drops off and the motor runs on almost constant voltage.

The direct current output voltage of the main rectifier 20 is controlled in the following manner.

Assume that the voltage across terminals 12, 13 falls below its predetermined desired value. The bridge circuit 34 unbalances and an output voltage appears across output junctions 34d causing a control voltage to be impressed on voltage control winding 31e of reactor 31. This control voltage is in the direction to increase the voltage impressed on signal winding 21e of reactor 21 to thus increase the direct current voltage of the main rectifier 20 until the predetermined desired value is reached to thus bring the bridge circuit 34 back toward balance. When the direct current voltage of main rectifier 20 rises above its predetermined desired value, the operation is the reverse of that just described.

Line drop compensation for the voltage drop in lines 18, 19 must be provided to maintain the voltage across load device 11 constant in the face of varying current in the load device. Line drop compensation is provided by the current limit device comprising bridge circuit 47 and saturable reactor 41 when the load current is above a predetermined normal value such as the value corresponding to point 70 in Fig. 8 and below a predetermined limit value such as the value corresponding to point 80 in Fig. 8. The transfer characteristic curve 53 of reactor 41, shown in Fig. 7, is such that between points 71 and 81, as the load current in load device 11 increases, the current limit control voltage impressed on current limit control winding 31d decreases, thus allowing the signal voltage impressed on signal winding 21e to increase to thus increase the direct current voltage of the main rectifier 20. Line drop compensation is thus accomplished to enable the voltage regulator to maintain the voltage of the load device constant in the face of increasing load current between a predetermined normal value and a predetermined limit value.

Below the normal value of current, the current limit device maintains a constant output to prevent the occurrence of the reverse of line drop compensation which would occur if the bridge circuit 47 did not have a reference voltage impressed thereon by rectifier 49. Without the reference voltage, the signal voltage impressed on signal winding 21e would increase in response to increases of the load current between zero and the predetermined normal value to accomplish the undesirable reverse of line drop compensation and would thereby hinder the voltage regulator tending to prevent it from maintaining the load voltage constant.

When the load current reaches its limit value, rectifier 48 produces a voltage indicated at 58 which causes bridge circuit 47 to operate at point 80 and saturable reactor 41 to operate at point 81. If the load current tends to exceed this limit value the output of reactor 41 increases greatly, causing the voltage impressed on current limit control winding 31d to increase greatly. This greatly decreases the voltage of signal winding 21e to greatly decrease the direct current voltage of the main rectifier 20 thereby limiting the load current to the predetermined desired value.

The current limit device thus provides both current limit action and line drop compensation. The line drop compensation is effective for load currents in a range between a predetermined normal value and a predetermined limit value. This is the range where line drop compensation is most needed because the current values are high. The line drop compensation action stops and the current limiting action begins when the current exceeds the limit value.

Additional line drop compensation may be obtained by modulating the voltage output across junctions 34d by the voltage drop in resistor 38. Resistor 38 is connected through rectifier 48 to current transformer 50 and is thus traversed with a current proportional to the load current in load device 11. This modulation compensates for the voltage drop in cables 18, 19 to enable the voltage regulator to maintain the voltage of the load substantially constant over the entire range of varying load current regardless of the voltage drop in the cables.

Features disclosed but not claimed herein are claimed in application of William F. Eagan, Serial No. 446,592, filed July 29, 1954.

Although only one embodiment of the invention has been illustrated and described, it will be obvious to those skilled in the art that various changes and modifications may be made therein without departing from the spirit of the invention and the scope of the appended claims.

It is claimed and desired to secure by Letters Patent:

1. A rectifying system comprising a load device, a source of alternating current, a first rectifier connecting said load device to said source for supplying direct current to said load device, a voltage regulator for controlling the direct current voltage of said first rectifier to normally maintain said voltage substantially constant, said regulator having a current limit responsive element, and a current limit device comprising a saturable reactor having a reactance winding and a saturating winding, means including a rectifier connecting said source to said reactance winding in series with said element for impressing a unidirectional current limit voltage on said element, four resistors connected in series to form a bridge circuit having two pairs of opposite junctions, one of said resistors being a nonlinear voltage dependent resistor, means including first rectifying means for impressing across one pair of said opposite junctions a unidirectional voltage dependent upon said direct current, means including second rectifying means for impressing across said one pair of opposite junctions a substantially constant unidirectional reference voltage, and means connecting the other pair of said opposite junctions across said saturating winding to impress thereon a reversible unidirectional saturating voltage dependent upon the value of said current for maintaining said saturating voltage constant when said current is below a predetermined normal value and for varying said saturating voltage in response to variations in said current when said current is above said normal value to decrease the unidirectional current limit voltage impressed on said element in response to increases in said current when said current is above said normal value and below a predetermined limit value thereby compensating for the voltage drop between said first rectifier and said load device to cause said voltage regulator to vary the direct current voltage of said first rectifier for maintaining the voltage across said load device substantially constant, and to increase said current limit voltage in response to increases in said current when said current is above said limit value to cause said voltage regulator to reduce the direct current voltage of said first rectifier thereby limiting said current to said predetermined limit value.

2. A rectifying system comprising a load device, a source of alternating current, a first rectifier connecting said load device to said source for supplying direct current to said load device, a first saturable reactor having a first reactance winding in series with said source and having a bias winding and a signal winding acting in opposition to each other for controlling the direct current voltage of said first rectifier, means for impressing a substantially constant unidirectional bias voltage on said bias winding, a second saturable reactor having a second reactance winding, means including a second rectifier connecting said source to said second reactance winding in series with said signal winding for impressing a unidirectional signal voltage on said signal winding, said second saturable reactor having a voltage control winding and a current limit control winding for controlling the magnitude of said signal voltage, means impressing on said voltage control winding a reversible unidirectional voltage varying in magnitude and direction with variations of the direct current voltage of said first rectifier from a predetermined value for normally maintaining said direct current voltage of said first rectifier substantially constant at said predetermined value, and a current limit device comprising a third saturable reactor having a third reactance winding and a saturating winding, means including a third rectifier connecting said source to said third reactance winding in series with said current limit control winding for impressing a unidirectional current limit voltage on said current limit control winding, and four resistors connected in series to form a bridge circuit having two pairs of opposite junctions, one of said resistors being a nonlinear voltage dependent resistor, means including first rectifying means for impressing across one pair of opposite junctions a unidirectional voltage dependent upon the direct current in said load device, means including second rectifying means for impressing across said one pair of opposite junctions a substantially constant unidirectional reference voltage, and means connecting the other pair of said opposite junctions across said saturating winding to impress thereon a reversible unidirectional saturating voltage dependent upon the value of said current for maintaining said saturating voltage constant when said current is below a predetermined normal value and for varying said saturating voltage in response to variations in said current when said current is above said normal value to decrease the unidirectional current limit voltage impressed on said current limit control winding in response to increases in said current when the value of said current is above a predetermined normal value and below a predetermined limit value thereby compensating for the voltage drop between said first rectifier and said load device to cause said voltage regulator to vary the direct current voltage of said first rectifier for maintaining the voltage across said load device substantially constant, and to increase said current limit voltage in response to increases in said current when the value of said current is above said predetermined limit value to cause said voltage regulator to reduce the direct current voltage of said first rectifier thereby limiting the value of said current to said predetermined limit value.

3. A system comprising a load device, a voltage source, means connecting said load device to said source, a voltage regulator for controlling the voltage of said source to normally maintain said voltage substantially constant, said regulator having a current limit responsive element, and a current limit device comprising a saturable reactor having a reactance winding and a saturating winding, means including a rectifier connecting a source of alternating current to said reactance winding in series with said element for impressing a unidirectional current limit voltage on said element, and four resistors connected in series to form a bridge circuit having two pairs of opposite junctions, one of said resistors being a nonlinear voltage dependent resistor, means including first rectifying means for impressing across one pair of said opposite junctions a unidirectional voltage proportional to the current in said load device, means including second rectifying means for impressing across said one pair of opposite junctions a substantially constant unidirectional reference voltage, and means connecting the other pair of said opposite junctions across said saturating winding to impress thereon a reversible unidirectional saturating voltage dependent upon the value of said current for maintaining said saturating voltage constant when said current is below a predetermined normal value and for varying said saturating voltage in response to variations in said current when said current is above said normal value to vary the unidirectional current limit voltage impressed on said element inversely with variations in said current when said current is above said normal value and below a predetermined limit value thereby compensating for the voltage drop between said voltage source and said load device to cause said voltage regulator to vary the voltage of said voltage source for maintaining the voltage across said load device substantially constant, and to vary said current limit voltage directly with variations in said current when said current is above said limit value to cause said voltage regulator to vary the voltage of said voltage source thereby limiting said current to said predetermined limit value.

4. A rectifying system comprising a load device, a source of alternating current, a first rectifier connecting said load device to said source for supplying direct current to said load device, a voltage regulator for controlling the direct current voltage of said first rectifier to normally maintain said voltage substantially constant, said regulator having a current limit responsive element, and a current limit device comprising a saturable reactor having a reactance winding and a saturating winding, means including a rectifier connecting said source to said reactance winding in series with said element for impressing a unidirectional current limit voltage on said element, and four resistors connected in series to form a bridge circuit having two pairs of opposite junctions, two of said resistors being nonlinear voltage dependent resistors, said two nonlinear resistors being disposed in opposite arms of said bridge circuit, means including first rectifying means for impressing across one pair of said opposite junctions a unidirectional voltage dependent upon said direct current, means including second rectifying means for impressing across said one pair of opposite junctions a substantially constant unidirectional reference voltage, and means connecting the other pair of said opposite junctions across said saturating winding to impress thereon a reversible unidirectional saturating voltage dependent upon the value of said current for maintaining said saturating voltage constant when said current is below a predetermined normal value and for varying said saturating voltage in response to variations in said current when said current is above said normal value to decrease the unidirectional current limit voltage impressed on said element in response to increase in said current when said current is above said normal value and below a predetermined limit value thereby compensating for the voltage drop between said first rectifier and said load device to cause voltage regulator to vary the direct current voltage of said first rectifier for maintaining the voltage across said load device substantially constant, and to increase said current limit voltage in response to increases in said current when said current is above said limit value to cause said voltage regulator to reduce the direct current voltage of said first rectifier thereby limiting said predetermined limit value.

5. A rectifying system comprising a load device, a source of alternating current, a first rectifier connecting said load device to said source for supplying direct current to said load device, a first saturable reactor having a first reactance winding in series with said source and having a bias winding and a signal winding acting in opposition to each other for controlling the direct current voltage of said first rectifier, means for impressing a substantially constant unidirectional bias voltage on said bias winding, a second saturable reactor having a second reactance winding, means including a second rectifier connecting said source to said second reactance winding in series with said signal winding for impressing a unidirectional signal voltage on said signal winding, said second saturable reactor having a voltage control winding and a current limit control winding for controlling the magnitude of said signal voltage, means impressing on said voltage control winding a reversible unidirectional voltage varying in magnitude and direction with variations of the direct current voltage of said first rectifier from a predetermined value for normally maintaining said direct current voltage of said first rectifier substantially constant at said predetermined value, and a current limit device comprising a third saturable reactor having a third reactance winding and a saturating winding, means including a third rectifier connecting said source to said third reactance winding in series with said current limit control winding for impressing a unidirectional current limit voltage on said current limit control winding, four resistors connected in series to form a bridge circuit having two pairs of opposite junctions, two of said resistors being nonlinear voltage dependent resistors, said two nonlinear resistors being disposed in opposite arms of said bridge circuit, means including first full wave rectifying means for impressing across one pair of said opposite junctions a unidirectional voltage dependent upon the direct current in said load device, means including second full wave rectifying means for impressing across said one pair of opposite junctions a substantially constant unidirecttional reference voltage, and means connecting the other pair of said opposite junctions across said saturating winding to impress thereon a reversible unidirectional saturating voltage dependent upon the value of said current for maintaining said saturating voltage constant when said current is below a predetermined normal value and for varying said saturating voltage in response to variations in said current when said current is above said normal value to decrease the unidirectional current limit voltage impressed on said current limit control winding in response to increases in said current when the value of said current is above a predetermined normal value and below a predetermined limit value thereby compensating for the voltage drop between said first rectifier and said load device to cause said voltage regulator to vary the direct current voltage of said first rectifier for maintaining the voltage across said load device substantially constant, and to increase said current limit voltage in response to increases in said current when the value of said current is above said predetermined limit value to cause said voltage regulator to reduce the direct current voltage of said first rectifier thereby limiting the value of said current to said predetermined limit value.

No references cited.